United States Patent [19]

Kawamura

[11] Patent Number: 5,483,933
[45] Date of Patent: Jan. 16, 1996

[54] COMBUSTION CHAMBER STRUCTURE FOR DIESEL ENGINES

[75] Inventor: Hideo Kawamura, Samukawa, Japan

[73] Assignee: Isuzu Ceramics Research Institute Co., Ltd., Kanagawa, Japan

[21] Appl. No.: 410,740

[22] Filed: Mar. 27, 1995

[30] Foreign Application Priority Data

Mar. 28, 1994 [JP] Japan .................................. 6-079311

[51] Int. Cl.$^6$ .................................................. F02F 3/26
[52] U.S. Cl. ........................... 123/254; 123/260; 123/271; 123/276
[58] Field of Search .................... 123/270, 271, 123/254, 276, 279, 260, 261

[56] References Cited

U.S. PATENT DOCUMENTS

| | | | |
|---|---|---|---|
| 1,818,339 | 8/1931 | Lang | 123/276 |
| 3,044,454 | 7/1962 | Sutton | 123/276 |
| 3,132,633 | 5/1964 | Zimmerman | 123/276 |
| 3,244,159 | 4/1966 | Meurer | 123/279 |

FOREIGN PATENT DOCUMENTS

| | | |
|---|---|---|
| 0235288A1 | 9/1987 | European Pat. Off. . |
| 0363190A2 | 4/1990 | European Pat. Off. . |
| 0598605A1 | 5/1994 | European Pat. Off. . |
| A612002 | 10/1926 | France . |
| C759323 | 7/1953 | Germany . |
| 62-93141 | 6/1987 | Japan . |
| 2-112613 | 4/1990 | Japan . |
| 5-26111 | 2/1993 | Japan . |
| A285469 | 1/1929 | United Kingdom . |
| A312018 | 5/1929 | United Kingdom . |

OTHER PUBLICATIONS

Patent Abstracts of Japan, vol. 18, No. 660 (M–1722), 14 Dec. 1994 JP–A–06 257441 (Isuzu) 13 Sep. 1994.
Patent Abstracts of Japan, vol. 14, No. 121 (M–0946), 7 Mar. 1990 JP–A–01 318751 (Isuzu) 25 Dec. 1989.
Patent Abstracts of Japan, vol. 17, No. 282 (M–1420), 31 May 1993 JP–A–05 010209 (Isuzu) 19 Jan. 1993.

*Primary Examiner*—Andrew M. Dolinar
*Attorney, Agent, or Firm*—Browdy and Neimark

[57] ABSTRACT

In this combustion chamber structure for diesel engines, precombustion chamber bodies in which precombustion chambers are formed are installed via heat insulating layers in cavities formed in pistons, so as to improve the heat insulating capability of the precombustion chambers and the combustion rates in the precombustion chambers and primary chambers, minimize the generation of HC and NOx increase the thermal efficiently. The precombustion chamber bodies comprise upper chambers, lower chambers and gaskets of a low heat conductivity provided between the upper and lower chambers. The upper chambers are provided in the walls thereof with central insert bores into which fuel injection nozzles are thrusted in positions in the vicinity of the upper dead centers of the pistons, and communication ports, which allows the primary chambers and precombustion chambers to communicate with each other, around the central insert bores.

10 Claims, 1 Drawing Sheet

COMBUSTION CHAMBER STRUCTURE FOR DIESEL ENGINES

BACKGROUND OF THE INVENTION

1. Field of the Invention

This invention relates to a combustion chamber structure for diesel engines in which a precombustion chamber body forming a precombustion chamber is provided in a cavity formed in a piston.

2. Description of the Prior Art

A swirl chamber type engine having swirl chambers has been developed for the purpose of improving the combustion of an engine. Such a twirl chamber type engine has swirl cambers formed in a cylinder head or piston heads, communication ports communicating with each other the swirl chambers and primary chambers formed in cylinders, and fuel injection nozzles for spraying a fuel in an atomized state into the swirl chambers, a gaseous mixture being formed by vortex currents flowing into the swirl chambers via the communication ports and the fuel injected into the swirl chambers, to carry out the primary combustion of the gaseous mixture, gases including flames and unburnt gaseous mixture being then ejected from the swirl chambers into the primary chambers via the communication ports to carry out the secondary combustion of the gaseous mixture. There is a precombustion chamber structure disclosed in Japanese Patent Laid-Open No. 112613/1990 as an example of such a swirl chamber type engine.

Japanese Utility Model Laid-Open No. 93141/1987 discloses a piston comprising a ceramic crown and an aluminum skirt. In this piston, an outer circumferential portion of the ceramic crown in which a cavity is formed is fitted in a head portion of the cylindrical aluminum skirt, and these two parts are fixed to each other by providing a cast iron ring and a plastic fluidized material in a clearance between the outer circumferential portion of the combustion chamber and the head portion.

Japanese Patent Laid-Open No. 26111/1993 discloses a heat insulating piston. In this piston, the heat insulating characteristics of a portion between a piston head and a piston skirt are secured, whereby the occurrence of cracks in and the scattering of the heat insulating member provided on a joint portion of the two parts in prevented.

The emission regulation has become severer in recent years, and various types of combustion chambers for diesel engines have been developed. In order to improve the fuel efficiency, a combustion chamber comprising an open chamber is used in many cases. An open chamber for a diesel engine is formed so as to scatter a fuel uniformly in a combustion chamber by using a high-pressure fuel injection pump, increase an explosive force by increasing a combusting rate, and improve the engine performance. However, in an open chamber, the density of air in the interior of a combustion chamber is large, and the temperature of the air around the atomized gaseous mixture becomes high with a rate of generation of NOx increasing to cause a big problem to arise.

In a precombustion chamber type engine having swirl chambers, two-stage combustion is carried out, in which a fuel is ignited and burnt in precombustion chambers, gases including flames and unburnt gaseous mixture being then ejected from the precombustion chambers into primary chambers via communication ports, the secondary combustion of the gaseous mixture being carried out in the primary chambers. Therefore, the generation of NOx decreases advantageously. However, in a precombustion chamber type engine, a combustion period becomes long, and the engine performance lowers. The conceivable reasons why the performance of a precombustion chamber type engine lowers are as follows. Namely, the reasons include (1) since precombustion chambers in a precombustion chamber type engine are positioned at circumferential portions of cylinders, the time of arrival of gases including flames and unburnt gaseous mixture, which are ejected from the precombustion chambers into primary chambers, at the cylinder wall surfaces becomes uneven, and the ejection period of time is long, so that a combustion period in the primary chambers cannot be reduced, (2) the speed of vortex current in the precombustion chambers in such a engine increases, and a heat loss from the precombustion chambers to the outside becomes large, and (3) since the cross-sectional area of the communication ports via which the primary and precombustion chambers in such an engine communicate with each other is as small as around 1.4%, a restriction loss of the communication ports becomes large, and output level does not become high.

The durability of a diesel engine is a very important property thereof for keeping the lifetime of the engine long. In the conventional techniques for making a combustion chamber of a diesel engine, combustion chamber manufacturing methods of casting cast iron into an aluminum alloy, forming alumina ($Al_2O_3$) by subjecting the surface of an alumina alloy to an oxidation process, or mixing ceramic fiber in an aluminum alloy are used. The production of a diesel engine has a problem of forming a combustion chamber to a heat insulating structure having a high strength and a high durability and capable of being produced simply.

SUMMARY OF THE INVENTION

A primary object of the present invention is to solve this problem, and provide a combustion chamber structure for diesel engines by providing a precombustion chamber body, which comprises upper and lower chambers, via an air layer and a heat insulating gasket in a cavity formed in the portion of a piston which corresponds to the substantially central portion of the relative cylinder, forming a precombustion chamber, which is provided in this precombustion chamber body, to a heat insulating structure, forming in the precombustion chamber body communication ports via which a precombustion chamber and a primary chamber are communicated with each other and which are opened so as to extend vadially toward the circumference of the cylinder and a central insert bore into which a fuel injection nozzle can be thrusted, enabling a fuel of a low cetane value to be used by maintaining the temperature of a precombustion chamber wall at a high level, reducing the generation of NOx by subjecting a gaseous mixture to primary combustion by ejecting gases including flames and unburnt gaseous mixture from the precombustion chamber into the portion of the primary chamber which corresponds to the circumference of the relative cylinder via the communication ports, whereby the generation of HC is reduced, and improving a thermal efficiency by reducing a heat loss and a restriction loss of the communication pores.

Another object of the present invention is to provide a combustion chamber structure for diesel engines, comprising pistons reciprocatingly moved in cylinders and provided with cavities in the portions thereof which correspond to the substantially central portions of the cylinders, fuel injection nozzles provided in a cylinder head, and precombustion chamber bodies formed in the cavities via air layers and gaskets of a low heat conductivity and defining the precombustion chambers in the portions thereof which correspond to the substantially central portions of the cylinders, the precombustion chamber bodies comprising upper and lower chambers and heat resisting gaskets interposed between these chambers, piston upper wall portions which define the precombustion chambers being provided with central insert bores through which the fuel injection nozzles can be thrusted into the precombustion chambers in positions in the vicinity of the upper dead centers of the pistons, and communication ports spaced from each other in the circumferential direction of the central insert bores and communicating the precombustion chambers and primary chambers with each other.

This combustion chamber structure for diesel engines is capable of reducing the generation of NOx by subjecting a gaseous mixture to primary combustion in the precombustion chambers of a heat insulating structure, increasing an air utilization rate by introducing gases, which include flames and an unburnt gaseous mixture, ejected from the precombustion chambers into the primary chambers via the communication ports and then to the circumferences of the cylinders uniformly in a short period of time, promoting the mixing of gases including flames and an unburnt gaseous mixture with each other with the gas ejection time reduced, completing secondary combustion in the primary chambers in a shorter combustion time, and improving the thermal efficiency by minimizing the generation of HC and smoke.

In the cavities formed in the pistons, upper chambers are placed on lower chambers via gaskets. Each upper chamber is formed at the portion of thereof which is positioned on an upper wall surface portion of the piston to a smaller diameter, and at the portion thereof which is under the smaller-diameter portion thereof to a larger diameter, and an annular stepped portion is formed at the part of the outer circumference of the upper chamber which corresponds to a boundary between the smaller-diameter portion and larger-diameter portion, an annular groove being formed by the wall surface of the cavity in the piston and the outer circumference of the smaller-diameter portion.

Projections are formed in a spaced manner on an outer circumferential surface of the upper chamber, and they partially contact the circumferential portion of the cavity in the piston. Clearance, in which the air layer is formed, are provided between the portion of the outer circumferential surface of the upper chamber which excludes those of the projections and the outer circumference of the cavity.

Between the contact parts of the upper surface of the stepped portion of the upper chamber and the annular ring, a gasket of a low heat conductivity is inserted firmly.

The upper chamber is provided with a plug bore into which a glow plug secured to the cylinder head thrusts in a position in the vicinity of the upper dead center of the piston.

The fuel injection nozzle has a multi-hole injection port, through which various kinds of fuels can be injected into the precombustion chamber, the communication ports mentioned above being formed so as to extend radially toward the circumference of the cylinder.

A gaseous mixture is subjected to primary combustion in the precombustion chamber of a heat insulating structure, whereby the generation of NOx is reduced. The gases including flames and an unburnt gaseous mixture ejected from the precombustion chamber into the primary chamber via the communication ports are ejected uniformly from the precombustion chamber into the primary chamber via the communication ports so that they advance to a circumferential portion of the cylinder at a stroke and at a high speed. Namely, the gases including flames and an unburnt gaseous mixture in the precombustion chamber are guided by the communication ports and turned into flame jets, which promote the mixing of themselves with the fresh air remaining in the primary chamber, whereby a combustion speed increases to cause the combustion period to be reduced. Consequently, the secondary combustion of the gaseous mixture can be completed in a short period of time, and the thermal efficiency can be improved. Moreover, the generation of HC and smoke can be minimized. Since this combustion chamber structure for diesel engines minimizes the occurrence of HC and, moreover, permits carrying out the primary combustion of a rich gaseous mixture in the precombustion chamber, the generation NOx can be minimized.

In this combustion chamber structure for diesel engines, the precombustion chamber body is formed by upper and lower chambers and a heat insulating gasket, and provided in the upper chamber with a central insert bore and communication ports spaced from each other in the circumferential direction of the central insert bore and communicating the precombustion chamber and primary chamber with each other. Therefore, the precombustion chamber body can be installed in the cavity of the piston easily and reliably, and the insulating structure for the precombustion chamber can be formed excellently with ease. Also, a loss of heat from the precombustion chamber to the outside can be reduced.

Since the air flows from a plurality of communication ports into the precombustion chamber, the velocity of vortex current in the precombustion chamber becomes low, so that a loss of heat from the precombustion chamber to the outside can be reduced to a low level. Furthermore, the communication ports are formed plurally in the precombustion chamber body, and the overall cross-sectional area of the communication ports becomes larger. Accordingly, a restriction loss of the communication ports decreases, and an output level increases.

The cavity provided in the piston is formed by a larger-diameter portion in which the upper chamber is provided, and a smaller-diameter portion in which the lower chamber is provided. In a boundary between the larger-diameter portion and smaller-diameter portion, an annular stepped portion is formed. The upper chamber is placed on an upper surface of the lower chamber via the gasket and on the annular stepped portion, and a fuel is injected into the precombustion chamber through the multi-hole injection port of the fuel injection nozzle, so that it becomes possible to improve the heat insulating capability of the precombustion chamber, increase the temperature of the precombustion chamber wall, and burn various kinds of fuels, such as a low-quality fuel of a low cetane value, i.e. a fuel difficult to be ignited, increase the temperature of the precombustion chamber wall, and prevent a failure in igniting a fuel in the precombustion chamber, whereby the primary combustion of a fuel is carried out excellently and reliably.

The upper chamber in the precombustion chamber body is provided in the outer circumference of an upper portion thereof with an annular stepped portion, and can be fixed to the piston simply by fusing a ring in an annular groove defined by this annular stepped portion and a peripheral portion of the cavity of the piston.

DESCRIPTION OF THE PREFERRED EMBODIMENT

Figure 1:
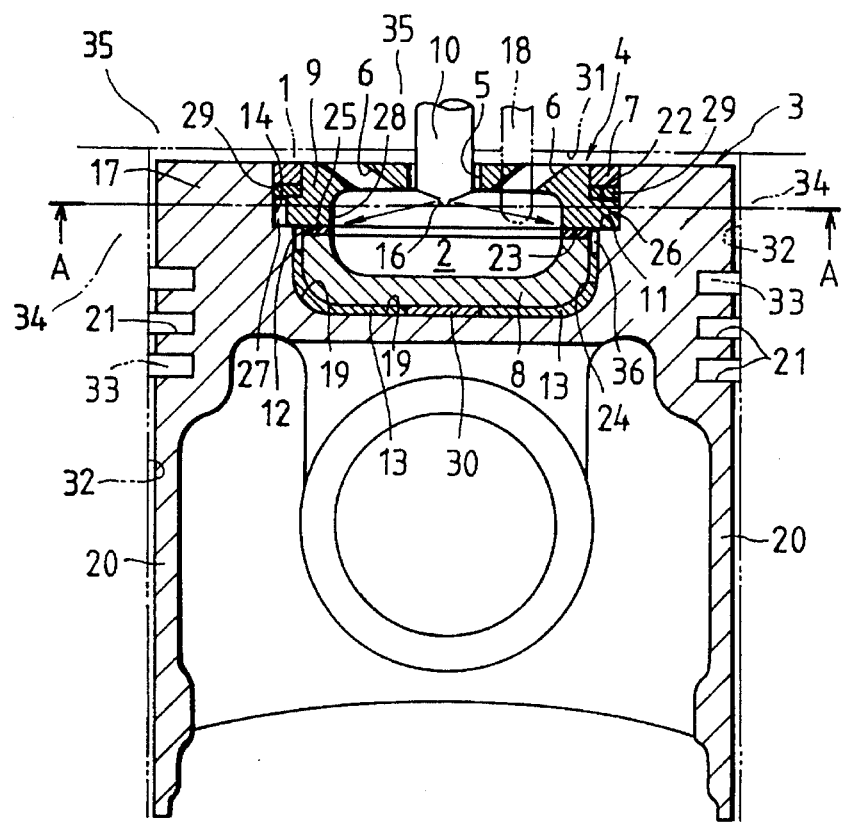
FIG. 1 is a sectional view of an embodiment of the combustion chamber structure for diesel engines according to the present invention.

An embodiment of the combustion chamber structure for diesel engines according to the present invention will now be described with reference to FIG. 1. A diesel engine in this embodiment has fuel injection nozzles 10 provided in a cylinder head 35 fixed to a cylinder block, and pistons 3 reciprocatingly moved in cylinders 32. This combustion chamber structure for diesel engines is provided with primary chambers 1 in the cylinders 32, and precombustion chambers 2 in the pistons 3. Each piston 3 comprises a piston skirt 20 formed out of a metal, such as an aluminum alloy, a piston head 17 formed integrally with the piston skirt 20, and a precombustion chamber body 4 provided in a cavity 19 formed in the piston head 17. The piston 3 is provided with piston ring grooves 21 in which a piston rings 33 are fitted.

This diesel engine is provided with fuel injection nozzles 10 and glow plugs 18 as starting aids in the cylinder head 35 so that the nozzles and plugs project from lower surface 31 of the cylinder head 35. In this combustion chamber structure, primary chambers 1 are formed in the cylinders 32, and precombustion chamber bodies 4 forming precombustion chambers 2 are provided in the cavities 19 formed in the portions of the piston heads 17 of the pistons 3 which correspond to the substantially central portions of the cylinders 32, via gaskets 13, 29, 30 of a low heat conductivity formed out of a heat insulating material, such as a ceramic material and air layers 27, 36. Each precombustion chamber body 4 comprises an upper chamber 9 and a lower chamber 8. The upper chamber 9 is provided with a central insert bore 5 formed in the substantially central portion thereof so that the fuel injection nozzle 10 can be thrusted into the precombustion chamber 2 therethrough in a position in the vicinity of the upper dead center of the piston, and communication ports 6 spaced from each other in the circumferential direction of the central insert bore 5, inclined toward the circumference of the cylinder 32 and communicating the precombustion chamber 2 and primary chamber 1 with each other. When occasion demands, the communication ports 6 formed in the precombustion chamber body 4 may extend in a direction which deviates from the center of the precombustion chamber 2.

Each cavity 19 formed in the piston head 17 of the piston 3 comprises a larger-diameter portion 14 in which the upper chamber 9 is provided, and a smaller-diameter portion 24 in which the lower chamber 8 is provided. The lower chamber 8 is provided in a smaller-diameter portion 24 in which the lower chamber 8 is provided. The lower chamber 8 is provided in a smaller-diameter portion 24 of the cavity 19 via heat insulating gaskets 30, 13 of a material of a low heat conductivity. In a boundary between the larger-diameter portion 14 and smaller-diameter portion 24, a stepped portion 11 is formed, and, between opposed surfaces 23, 25 of the upper and lower chambers 9, 8 of the precombustion chamber body 4, a gasket 12 comprising a heat insulating material of a low heat conductivity, such as zirconia is provided. The upper chamber 9 is placed on the stepped portion 11 and an upper surface, i.e. an opposed surface 25 of the lower chamber 8 via the gasket 12. The upper chamber 9 is provided with an annular stepped portion 22 in an outer circumference of an upper portion thereof. In an annular groove defined by the annular stepped portion 22 and a peripheral part of the larger-diameter portion 14 of cavity 19, a ring 7 is provided via a heat insulating gasket 29. The heat insulating gaskets 29, 30 are formed out of a heat insulating material of a low heat conductivity, such as zirconia.

Figure 2:
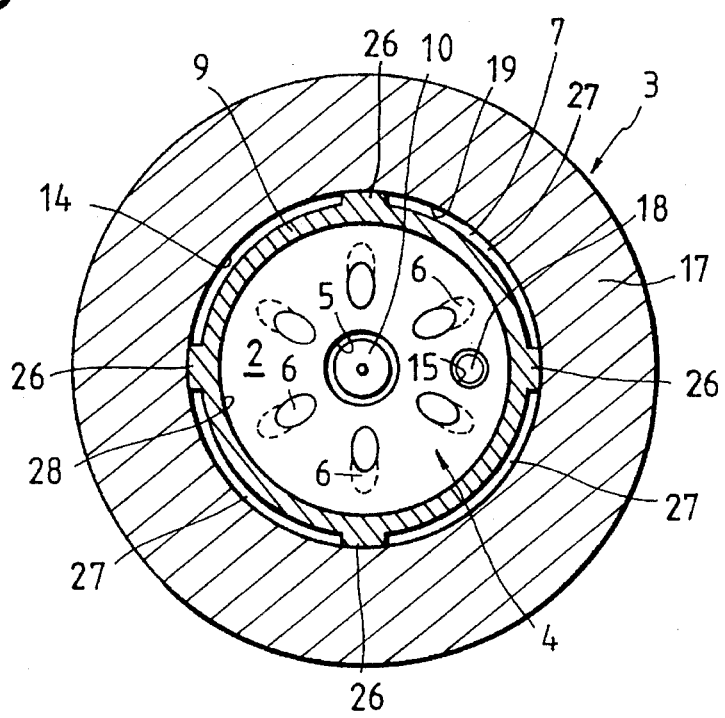
FIG. 2 is a sectional view taken along the line A—A in FIG. 1.

The peripheral portion of the ring 7 is fitted in and fused to that of the larger diameter portion 14 of the cavity 19 in the piston head 17 so as to seal the upper surface of the piston. The ring 7 is formed out of, for example, an aluminum alloy, a metal identical with that out of which the piston head 17 is formed which comprises an aluminum alloy. The ring 7 is therefore fused easily by, for example, electron beam welding to a circumferential edge portion of the cavity 19 in the piston head 17. The upper chamber 9 is provided on an outer circumferential surface of the upper chamber 9 with a plurality (four in the embodiment of FIG. 2) of projections 26 which are spaced in the circumferential direction, and free end portions of these projections 26 are contact-fitted to a circumferential portion of the cavity 19 in the piston 3. Circumferentially spaced clearances 27 are formed between the portions of the outer circumferential surface of the upper chamber 9 which are other than the surfaces of the projections 26 and the circumference of the cavity 19 in the piston 3.

The precombustion chamber body 4 comprising the upper and lower chambers 9, 8 is formed out of a heat resisting material, such as a heat resisting titanium alloy nickel-chromiumferroalloy and silicon nitride. A gasket of a low heat conductivity is formed out of ceramic fiber of a low heat conductivity, and provided between a wall surface of the smaller-diameter portion 24 of the cavity 19 and the outer surface of the lower chamber 8, the gasket 30 of zirconia of a low heat conductivity being provided so as to partially contact the wall surface of the cavity 19. Accordingly, the precombustion chamber 2 is formed to a heat insulating structure by providing the precombustion chamber body 4 in the cavity 19 in the piston 3 via the gaskets 13, 29, 30 and air layers 27, 36. Owing to the precombustion chamber 2 formed to a heat insulating structure, a low-quality fuel of a low cetane value can be burnt, so that various kinds of fuels can be used. Moreover, since the temperature of the wall of the precombustion chamber 2 becomes high, the amount of HC discharged decreases, and the generation of NOx can be reduced owing to the primary combustion of a fuel in the precombustion chamber 2.

The fuel injection nozzle 10 has a multi-hole injection port 16 from which a fuel is ejected into the precombustion chamber 2 in a position in the vicinity of the upper dead center of the piston. From the multi-hole injection port 16 of the fuel injection nozzle 10, various kinds of fuels can be ejected into the precombustion chamber 2. The upper chamber 9 is provided with a plug bore 15 into which a glow plug 18 fixed to the cylinder head 3 is thrusted in a position in the vicinity of the upper dead center of the piston.

A plurality of communication ports 6 are opened incliningly with respect to a lower surface 31 of the cylinder head toward the circumstance of the cylinder 32, and they are formed plurally, for example, 4–6 ports are formed so as to be spaced regularly around the central insert bore 5 and extend radially, in such a manner that gases including flames and unburnt gaseous mixture are ejected from the prechamber 2 into the primary chamber 1 toward the circumference of the cylinder. Owing to the communication ports 6 provided around the insert bore 5, the spray travel of the gases including flames and unburnt gaseous mixture ejected from the precombustion chamber 2 into the primary chamber 1 becomes shorter uniformly, and the arrival time of the gases to the circumference of the cylinder 32 decreases.

The fuel injection nozzle 10 extends from the lower surface 31 of the cylinder head in the downward direction and is adapted to be thrusted in a position in the vicinity of the upper dead center of the piston into the insert bore 5 and positioned in the central portion of the precombustion chamber 2, in such a manner that a fuel is ejected from the multi-hole injection port 16 of the fuel injection nozzle 10 into the precombustion chamber 2 so as to have the fuel advance from the center of the precombustion chamber 2 to a wall surface 28 thereof. The precombustion chamber 2 formed in the precombustion chamber body 4 is positioned in the substantially central portion of the cylinder 32, and the communication ports 6 communicating the precombustion chamber 2 and primary chamber 1 with each other is formed so as to be positioned at the outer circumferential portion of the precombustion chamber 2.

Since this combustion chamber structure for diesel engines is constructed as described above, it can be operated as follows.

In this combustion chamber structure for diesel engines, the suction air introduced into the cylinder 32 through a suction port in a suction stroke is compressed in a compression stroke, and enters the precombustion chamber 2 through the communication ports 6 and insert bore 5. When the insert bore 5 is substantially closed with the fuel injection nozzle 10 in a position before the compression upper dead center, highly compressed air is further introduced into the precombustion chamber 2 through the communication ports 6. In this condition, the fuel is ejected from the multi-hole injection port 16 of the fuel injection nozzle 10 into the precombustion chamber 2, in which the fuel and air are mixed with each other, the resultant gaseous mixture being ignited and burnt in a fuel-rich condition, whereby the occurrence of NOx can be minimized. The operation of the engine then transfers to an expansion stroke. In an initial stage of the expansion stroke, the insert bore 5 is substantially closed with the fuel injection nozzle 10, so that the gases including flames and unburnt gaseous mixture in the precombustion chamber 2 are ejected therefrom into the primary chamber 1 through the communication ports 6.

Since the communication ports 6 communicating the primary chamber 1 and precombustion chamber 2 with each other are formed plurally so as to be spaced in the circumferential direction of the precombustion chamber 2, a total cross-sectional area o the passages constituting the communication ports 6 can be set large, and a restriction loss can be reduced. Moreover, the precombustion chamber 2 is formed in the substantially central portion of the piston, i.e., in the substantially central portion of the cylinder 32, and the gases including flames and unburnt gaseous mixture ejected from the outer circumferential portion of the precombustion chamber 2 into the primary chamber 1 through the communication ports 6 turn into a flame Jet current, which involves the fresh air in the primary chamber to improve an air utilization rate and promote the premixed combustion. The piston 3 then moves down and the fuel injection nozzle 10 comes out of the insert bore 5 to cause the insert bore 5 to be opened. The gases including flames and unburnt gaseous mixture are then ejected from the precombustion chamber 2 into the primary chamber 1 through the insert bore 5, whereby the mixing of the gases with the air in the central portion of the primary chamber 1 is promoted to increase the combustion speed. Accordingly, the combustion period can be reduced, and the combustion of the gaseous mixture can be carried out with rates of generation of NOx, HC and smoke minimized.

What is claimed is:

1. A combustion chamber structure for diesel engines, comprising, a cylinder block forming cylinders therein, a cylinder head fixed on said cylinder block, pistons reciprocatingly moving in said cylinders and provided with cavities in the substantially central portions thereof, primary chambers formed in said cylinders, fuel injection nozzles provided in said cylinder head so as to project from the lower surface thereof, precombustion chamber bodies provided in said cavities, forming precombustion chambers in the substantially central portions of said cylinders, and formed by upper chambers, lower chambers opposed to said upper chambers, and heat resisting gaskets interposed between said upper chambers and said lower chambers, gaskets of a low heat conductivity provided between said cavities and said precombustion chamber bodies, and air layers formed between wall surfaces of said cavities and outer surfaces of said precombustion chamber bodies, and central insert bores, through which said fuel injection nozzles can be thrusted into said precombustion chambers in positions in the vicinity of upper dead centers of said pistons, and communication ports provided so as to be spaced from each other in the circumferential direction of said central insert bores, allowing said precombustion chambers and said primary chambers to communicate with each other and opened so as to extend radially toward the circumferences of the cylinders, which insert bores and communication ports are formed in upper wall portions of said pistons.

2. A combustion chamber structure for diesel engines according to claim 1, wherein said upper chambers are placed on said lower chambers via said gaskets in said cavities formed in said pistons.

3. A combustion chamber structure for diesel engines according to claim 1, wherein said cavities in said pistons are formed by smaller-diameter cavities in which said lower chambers are provided, and larger-diameter cavities in which said upper chambers are provided, stepped portions being formed at boundaries between said smaller-diameter cavities and said larger-diameter cavities.

4. A combustion chamber structure for diesel engines according to claim 3, wherein said upper chmabers are provided by being placed on said stepped portions and said gaskets provided on upper end surfaces of said lower chambers.

5. A combustion chamber structure for diesel engines according to claim 1, wherein the parts of said upper chambers which correspond to said upper surface portions of said pistons are formed as smaller-diameter portions, the parts of said upper chambers which are under said smaller-diameter portions being formed as larger-diameter portions, annular stepped portions being formed on the parts of outer circumferences of said upper chambers which correspond to boundaries between said smaller-diameter portions and said larger-diameter portions, annular grooves being formed by said wall surfaces of said cavities and outer circumferences of said smaller-diameter portions.

6. A combustion chamber structure for diesel engines according to claim 5, wherein rings are fitted in said annular grooves formed between said wall surfaces of said cavities and said outer circumferences of said smaller-diameter portions, said rings being fused to said wall surfaces of said cavities and said outer circumferences of said smaller-diameter portions.

7. A combustion chamber structure for diesel engines according to claim 6, wherein said gaskets of a low heat conductivity are provided between upper surfaces of said annular stepped portions of said upper chambers and said rings.

8. A combustion chamber structure for diesel engines according to claim 5, wherein said upper chambers are provided on outer circumferential surfaces of said larger-diameter portions thereof with projections so that said projections are spaced from each other, said projections partially contacting peripheral portions of said cavities in said pistons, clearances in which air layers are formed being formed between said outer circumferential surfaces of the parts of said larger-diameter portions of said upper chambers which exclude said projections and circumferences of said cavities.

9. A combustion chamber structure for diesel engines according to claim 1, wherein said upper chambers are provided with plug bores into which glow plugs provided in said cylinder head is thrusted in positions in the vicinity of the upper dead centers of said pistons.

10. A combustion chamber structure for diesel engines according to claim 1, wherein said fuel injection nozzles have injection ports, through which a fuel can be ejected into said precombustion chambers, said communication ports being formed so as to extend radially toward the circumference of said cylinders.

* * * * *